No. 897,247. PATENTED AUG. 25, 1908.
J. D. BAKER.
COMBINED SIDE DELIVERY RAKE AND TEDDER.
APPLICATION FILED MAR. 14, 1907.

3 SHEETS—SHEET 1.

Witnesses:

Inventor
John David Baker
By
James L. Norris.
Atty.

No. 897,247.

PATENTED AUG. 25, 1908.

J. D. BAKER.
COMBINED SIDE DELIVERY RAKE AND TEDDER.
APPLICATION FILED MAR. 14, 1907.

3 SHEETS—SHEET 3.

Witnesses:

Inventor
John David Baker
By
James L. Norris
Attys.

UNITED STATES PATENT OFFICE.

JOHN DAVID BAKER, OF LISBON, OHIO, ASSIGNOR OF ONE-HALF TO LISBON IMPLEMENT COMPANY, OF LISBON, OHIO, A CORPORATION OF OHIO.

COMBINED SIDE-DELIVERY RAKE AND TEDDER.

No. 897,247.     Specification of Letters Patent.     Patented Aug. 25, 1908.

Application filed March 14, 1907. Serial No. 362,364.

*To all whom it may concern:*

Be it known that I, JOHN DAVID BAKER, a citizen of the United States, residing at Lisbon, in the county of Columbiana and State of Ohio, have invented new and useful Improvements in a Combined Side-Delivery Rake and Tedder, of which the following is a specification.

This invention relates to a combined hay tedder and side delivery rake, and the primary object of the same is to provide a comparatively simple organization of elements which are readily adjustable to convert the device from a tedder to a rake, or vice versa, and by the reversal modify the direction of movement of the tedder or rake members without resorting to the use of clutches or complex mechanisms that are liable to become disengaged, clogged or broken.

The improved combined device is strong and durable in its structure, and the number of parts are minimized to such an extent as to render the device economical in the cost of manufacture.

The essential feature of the invention is a shiftable frame fulcrumed on the axle and carrying a multiple crank shaft to which the tedder or rake members are connected, the ground or carrying wheels on the axle having gear devices which are thrown into mesh with coöperating gear elements for actuating the crank shaft when the frame is shifted or moved to either one of its two positions.

The invention also embodies details of construction which will be more fully hereinafter specified.

Figure 1:
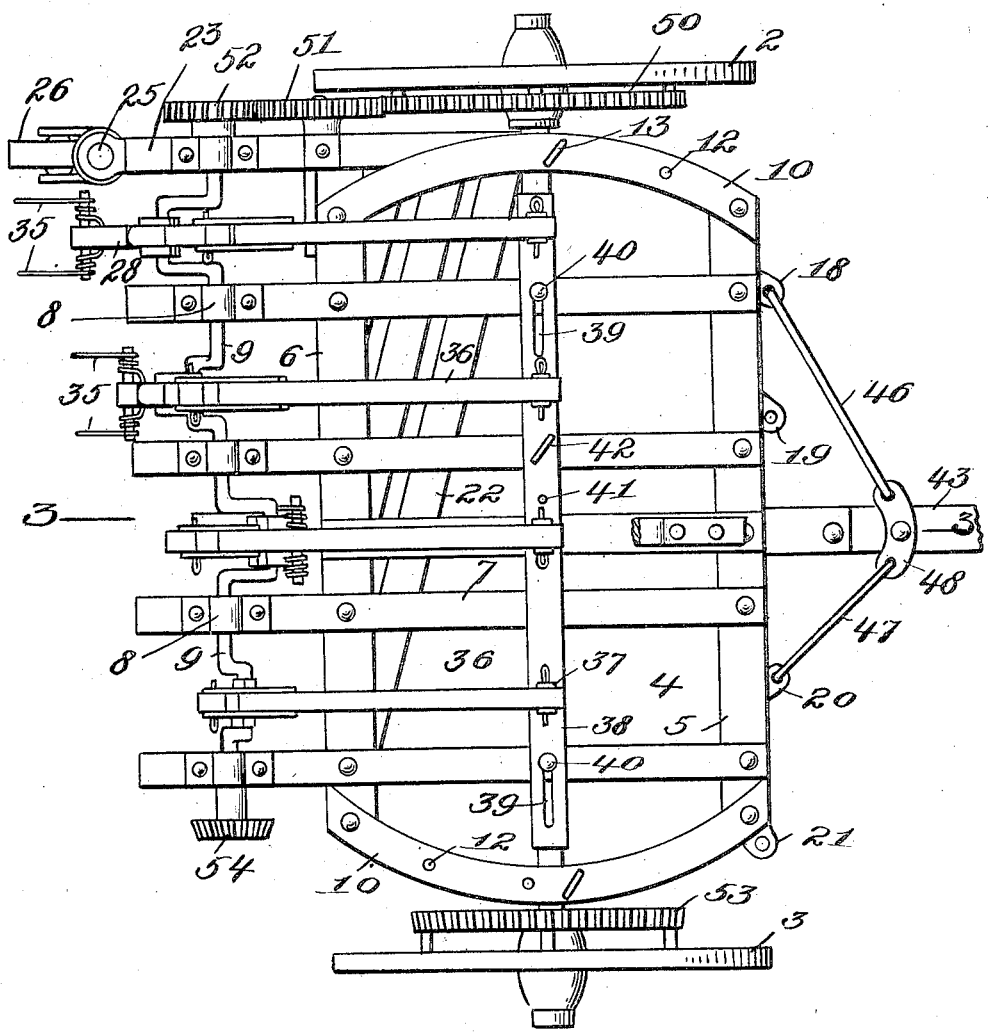
Figure 2:
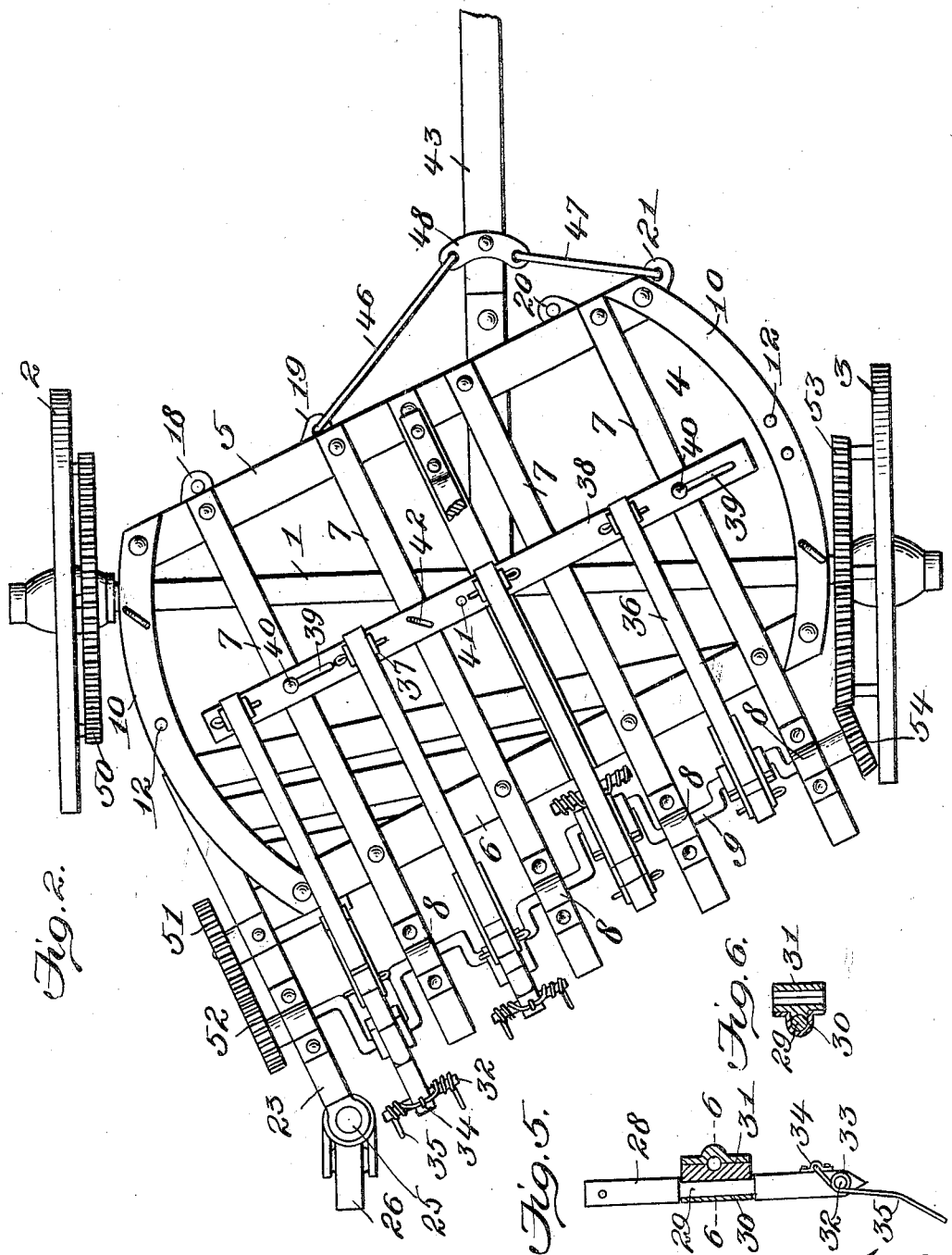
Figure 3:
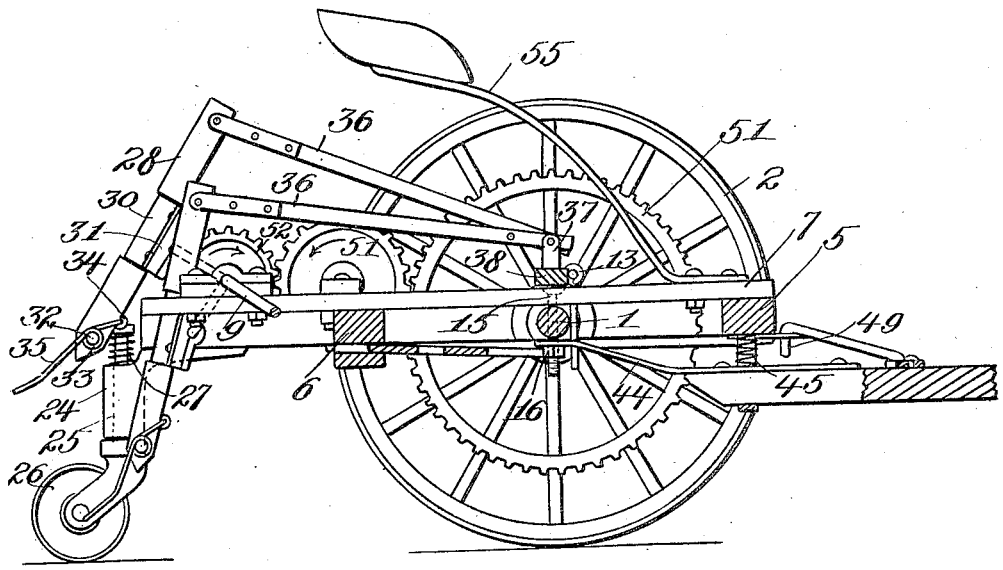
Figure 4:
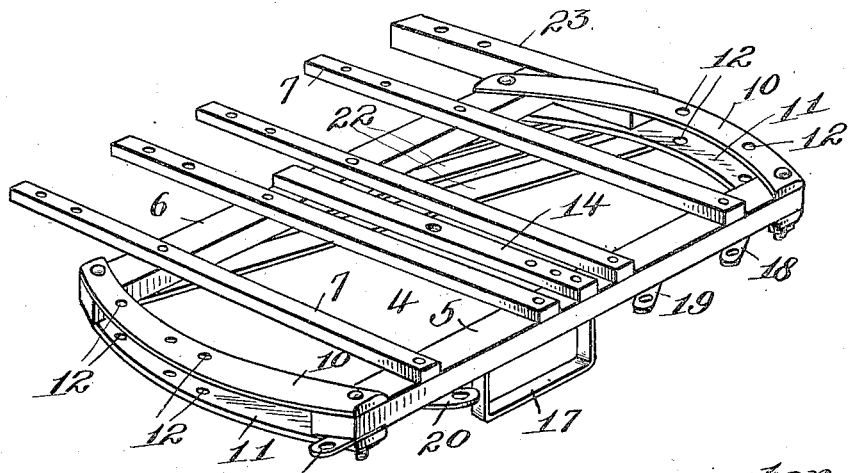

In the drawings, Figure 1 is a top plan view of a machine embodying the features of the invention and shown arranged as a tedder, the tongue being broken away. Fig. 2 is a view similar to Fig. 1, showing the machine arranged as a side delivery rake. Fig. 3 is a longitudinal vertical section on the line 3—3, Fig. 1. Fig. 4 is a detail perspective view of the shiftable frame. Fig. 5 is a detail view of one of the tedder or rake members showing the bearing therefor in section. Fig. 6 is a horizontal section on the line 6—6 of Fig. 5.

Similar characters of reference are employed to indicate corresponding parts in the views.

The numeral 1 designates an axle, having ground or carrying wheels 2 and 3, rotatably mounted on opposite extremities thereof. A shiftable frame 4 is fulcrumed on the axle and comprises side connecting bars 5 and 6 at the front and rear thereof, and cross bars 7 which are extended a suitable distance in rear of the bar 6, the rear extended portions of the cross bars 7 having thereon suitable journal boxes 8 to rotatably receive a multiple crank shaft 9. At each end of the frame 4 and terminally attached to the bars 5 and 6 are arcuate bars 10 and 11, which embrace the axle 1 and have openings 12 therein to removably receive a key pin 13 to retain the frame in adjusted position on the axle. The frame 4 is also provided with a central fulcrum bar 14 extending transversely thereover and connected by a fulcrum pin or bolt 15 to the axle 1, as clearly shown by Fig. 3. The fulcrum pin or bolt 15 extends through and below the axle and has a lower screw threaded extremity with a nut 16 thereon.

Depending from the front cross bar 5 of the frame 4, to one side of the center, is a pole guide clip 17, and extending out from the same cross bar are apertured brace attaching clips 18, 19, 20 and 21, the clip 21 being projected from the one end of the said cross bar. Secured to the bottom portion of the frame 4 are guard strips 22, which are diagonally disposed and extend over the under portion of one extremity of the frame to prevent hay or other material rolled under and forward and towards one side of the machine from working up between the parts of the frame, particularly when the machine is arranged as a side delivery rake. Projecting rearwardly from one end of the frame and extending between a portion of the arcuate bars 10 and 11 at said end, is a trailer supporting beam 23. Secured to the trailer beam 23, is a socket 24 in which the post 25 of a trailer wheel 26 is rotatably mounted, a spring 27 being interposed between the upper end of the post and the top of the socket to cushion the trailer wheel and the frame as an entirety.

The crank shaft 9 has each of the cranks thereof in a different position or angle, or, in other words, no two of the cranks have the same angle with respect to the body of the shaft. On these cranks tedder or rake members are adjustably mounted, and each member comprises an arm 28, having an intermediate reduced portion 29, rotatably mounted in a socket 30 forming part of a box 31 engaging one of the cranks of the shaft 9. In the lower end of the arm 28 is a cross pin 32, having the opposite portions of a fork coiled therearound, as at 33, the loop of the fork passing around the lower extremity of the arm and secured thereto, as at 34. From the coils 33 the tines 35 of the fork depend and are given a proper curvature to render them effective in the operations for which they are used. To the upper end of each arm a connecting bar 36 is movably attached, the opposite or forward extremity of the connecting bar being also movably secured between fulcrum ears 37, rising from a slide 38 extending longitudinally over the center of the frame 4. It will be understood that the function of the connecting bars 36 is to cause the arms 28 of the rake or tedder members to swing on the cranks of the shaft 9, and thus obtain the desired movement of the forks on the lower ends of the arms 28, both when the machine is arranged as a tedder and as a side delivery rake. The rear ends of the connecting bars 36 are detachably secured to the upper ends of the arms 28, so that the latter may be reversed or turned in the sockets 30 to have the tines 35 of the forks directed rearwardly when the machine is arranged as a tedder, or forwardly when used as a side delivery rake. After the adjustment has been made, or the position of the forks changed, the several connecting bars are reattached to the upper ends of the arms 28. The forks on the lower ends of the arms 28 are resilient and yield sufficiently to prevent distortion or breakage thereof in performing their function, and in the event that they come in contact with some obstruction during the movement of the machine. It will be understood that the cranks of the shaft 9 alternately lower and raise the arms 28, and the connecting bars depress and elevate in consonance with the arms and at the same time impart an oscillating movement to the said arms.

The slide bar 38 or the adjusting means for the connecting bars 36 has longitudinal slots 39 formed therein at opposite extremities and engaged by headed studs or screws 40 secured in the cross bars 7 immediately thereunder. At its central portion the slide bar 38 is formed with openings 41 for engagement by a key pin 42, which also extends downwardly into one of the cross bars 7 near the center of the frame 4. This key pin 42 locks the slide bar 38 in its adjusted position, and when the said slide bar is shifted the connecting bars 36 and the tedder or rake members are correspondingly shifted, the purpose of this adjustment being to have the forks on the lower extremities of the rake or tedder members held either at an angle to or parallel with the axle 1. This adjustment of the forks may be made either when the machine is arranged as a tedder or as a side delivery rake, and this change of position of the forks will modify the throw of the hay or other material engaged by the forks.

A tongue 43 is adjustably mounted in the forward portion of the frame 4 and extends through the guide clip or loop 17, and has a metallic bar or extension 44 secured to the rear end and loosely and adjustably held on the lower projecting end of the fulcrum pin or bolt 15 by the nut 16. The connection between the metallic bar or extension 44 and the fulcrum pin or bolt 15 is loose so that the tongue may have a free rising and falling movement, to a limited extent, and on the rear extremity of the tongue is fixed a cushion spring 45, which is adapted to contact with the forward bar 5 of the frame 4, as shown by Fig. 3. The spring 45 carried by the tongue 43, and the spring 27 on the shank or stem 25 of the trailer wheel, operate to relieve the forks of strain and excessive pressure in going over high places in the ground. When the machine is arranged as a tedder the tongue 43 is disposed in longitudinal relation or in a plane parallel with the cross bars 7 of the frame 4. When the frame 4, however, is adjusted to arrange the machine as a side delivery rake, and as shown by Fig. 2, the bars 7 are at an angle to the tongue 43, or, in other words, the forks of the tedder or rake members are diagonally disposed with respect to the longitudinal draft established through the tongue. The tongue is maintained in positive position with relation to the frame in either adjustment of the latter by brace rods 46 and 47, movably attached to the ends of a coupling plate 48 secured on the tongue and having their extremities provided with hooks, as at 49, to removably engage the clips 18, 19, 20 and 21. When the machine is adjusted to serve as a tedder the brace rod 46 engages the clip 18 and the brace rod 47 is connected to the clip 20. When the frame 4 is shifted, as shown by Fig. 2, to dispose the parts of the machine as a side delivery rake, the brace rods 46 and 47 respectively engage the clips 19 and 21. The brace rods 46 and 47 operate as intermediate draft transmitting devices, and are essential in view of the fact that the axle 1 is not positively secured to the frame 4, and hence it is necessary to introduce a positive draft transmitting means between the tongue and the frame.

The gearing for operating the crank shaft 9 is very simple and does not require any particular adjustment with relation to the individual parts thereof, as the change of position of the frame 4 establishes a gear connection between the opposite extremities of the crank shaft and the opposite ground or carrying wheels 2 and 3, to obtain a reverse movement of the crank shaft necessary when the machine is converted from a tedder into a side delivery rake, or vice versa. On the ground or carrying wheel 2 a spur gear 50 is fixed and is adapted to be thrown into mesh with a transmitting pinion 51 rotatably supported by the trailer beam 23, the said transmitting pinion being always in mesh with a power receiving pinion 52 fixed on the adjacent end of the crank shaft 9, the said end of the crank shaft having bearing also on the rear portion of the trailer beam 23. The gearing 50 and pinions 51 and 52 are accurately thrown into mesh when the frame 4 is turned to bring the bars 4 and 5 thereof in parallel relation to the axle 1, or when the machine is used as a tedder, and under such conditions the motion of the pinions 51 and 52 will be in the direction indicated by the arrows in Fig. 3 to cause the crank shaft to rotate in a forward direction and throw the arms 28 rearwardly or to kick the hay or other material outwardly from the rear end of the machine.

On the ground or carrying wheel 3, a bevel gear 53 is secured and adapted to mesh with a bevel pinion 54 on the adjacent end of the crank shaft 9 when the frame 4 is shifted at an angle to the axle 1, or to arrange the machine as a side delivery rake, the mere shifting of the frame from one position to the other establishing the proper gear connection to obtain the direction of movement of the crank shaft 9 desired either to have the machine practically perform the function of a tedder, or of a side delivery rake. When the bevel pinion 54 is in mesh with the bevel gear 53 a movement is imparted to the crank shaft 9 reverse to that imparted to the said shaft when the pinions 51 and 52 are in mesh with the gear 50, or the tedder or rake members are caused to move forwardly or throw the hay or other material under the machine. When the frame 4 is adjusted, as shown by Fig. 2, to arrange the machine as a side delivery rake, the forks are all turned so as to project the tines thereof in a forward direction, and when the frame 4 is shifted to the position shown by Fig. 1, the said forks are adjusted to have the tines thereof project rearwardly, for obvious reasons.

A driver's seat 55 is mounted in suitable position on the frame, and is held by a suitable yielding support.

The operation of the machine either as a tedder or side delivery rake will be readily understood from the foregoing description, and it will be observed that when the frame 4 is shifted to the position shown by Fig. 2 the forks throw the hay or other material towards one side of the machine in planes at an angle to the line of draft, the material picked up and pushed forward by the individual tedder or rake members being commingled and thrown out to one side of the machine in the form of a windrow. It will also be understood that the trailer wheel 26 automatically disposes itself in proper position with respect to the frame 4 when the latter is adjusted, by reason of the fact that the beam 23 is secured to and forms a part of the said frame.

The change of position of the frame 4 is accomplished through the tongue 43, first, chocking or otherwise holding the wheels 2 and 3 to prevent movement of the entire machine. The movement of the tongue may be performed either manually or by the draft animals, and in the operation of moving or shifting the tongue the brace rods 46 and 47 have an important function in addition to serving as intermediate draft transmitting means. In view of the fact that the rear end of the tongue is pivotally connected to the fulcrum pin or bolt 15, and detachably secured to the frame 4, through the medium of the braces or rods 46 and 47, the said frame may be readily moved from one position to the other, the said braces or rods being allowed to remain in their connected relation to the frame 4, and subsequent to the adjustment or movement of the tongue the braces or rods 46 and 47 may be readily disconnected and reassembled with relation to the frame 4 to accommodate the position of the latter when the machine is arranged either as a tedder or side delivery rake. In moving the frame 4, it will be understood that the key pins 13 will be withdrawn from the engaged openings 12 and reset in different openings in the arcuate bars 10 and 11.

The several parts of the machine are capable of changes in the proportions, dimensions and minor details of construction, and such changes will be made as fairly fall within the scope of the claims.

Having thus described the invention, what is claimed, is:

1. In a combined side delivery rake and tedder, ground wheels, a frame movable to different positions between the ground wheels and carrying a multiple crank shaft provided with reversible forks, and means separably engaging the crank shaft when the frame is moved to different positions for reversely operating the said crank shaft 2. In a combined side delivery rake and tedder, ground wheels, a frame movable to different positions between the ground wheels, and a plurality of reversible forks carried by the frame having means coöperating therewith for simultaneously changing their angle relatively to the said frame.

3. In a combined side delivery rake and tedder, ground wheels, a frame movable to different positions independently of the ground wheels and relatively to the line of draft, and individually reversible forks carried by the frame having means coöperating therewith for simultaneously changing their angle relatively to the said frame.

4. In a combined side delivery rake and tedder, ground wheels, a frame movable to different positions between the ground wheels and relatively to the line of draft, a plurality of forks all simultaneously movable with the frame, and means for simultaneously changing the direction of movement of the forks relatively to the line of draft.

5. In a combined side delivery rake and tedder, a movable frame carrying a plurality of reversible forks, and means for simultaneously adjusting the forks to change their direction of movement and angle relatively to the line of draft without changing the position of the frame.

6. In a combined side delivery rake and tedder, a movable frame carrying a plurality of forks, and means for simultaneously changing the angular position of the forks relatively to the frame and the line of draft without moving the frame.

7. In a combined side delivery rake and tedder, an axle having ground wheels with gear devices thereon, a frame pivotally mounted on the axle and shiftable to different angular positions, a crank shaft carried by the frame and also provided with gear devices at opposite extremities, the direction of movement of the crank shaft being reversed by alternately shifting the frame and causing the gear devices on the said shaft to engage the opposite gear devices on the ground wheels, and a plurality of reversible forks mounted on the crank shaft.

8. In a combined side delivery rake and tedder, an axle having ground wheels provided with gear devices, a frame movable on the axle and carrying a multiple crank shaft with terminal gear devices adapted to be alternately thrown into mesh with the gear devices on the ground wheels, and a plurality of reversible forks mounted on the crank shaft.

9. In a combined side delivery rake and tedder, an axle having ground wheels, a frame shiftable on the axle and carrying a crank shaft having a plurality of reversible forks mounted thereon, a draft tongue connected to and operative to shift the frame, and mechanism for reversely operating the crank shaft when the frame is in different positions.

10. In a combined side delivery rake and tedder, a shiftable frame, an axle provided with ground wheels on which the said frame is mounted, a plurality of reversible forks carried by the frame and changeable as to their direction of movement, and a draft tongue to shift the frame, the tongue being connectible to different portions of the frame.

11. In a combined side delivery rake and tedder, a shiftable frame, an axle having the frame mounted thereon and provided with ground wheels, a plurality of reversible forks carried by the frame and simultaneously changeable as to their direction of movement independently of the movement of the frame, and a draft tongue connected to the frame.

12. In a combined side delivery rake and tedder, a shiftable frame carrying a reversibly movable multiple crank-shaft having a plurality of reversible forks mounted thereon, means whereby the rotation of the shaft is reversed when the frame is moved from one position to another, and draft means connected to and operative to shift the frame.

13. In a combined side delivery rake and tedder, the combination of an axle having ground wheels thereon, a frame pivotally mounted and shiftable on the axle and carrying a plurality of reversible forks adapted to have their direction of movement changed, and a draft tongue also pivotally assembled in relation to the axle and adjustably connected to the frame.

14. In a combined side delivery rake and tedder, the combination of an axle having ground wheels thereon, a pivoted frame shiftable on the axle and carrying a plurality of reversible forks changeable as to their direction of movement, and a draft tongue also pivotally assembled in relation to the axle and adjustably connected to the frame, a spring being interposed between the tongue and forward portion of the frame.

15. In a combined side delivery rake and tedder, an axle having ground wheels, a pivoted frame shiftable on the axle, and carrying a plurality of reversible forks, means for changing the direction of movement of the forks, a trailer connected to the frame and movable with the latter, and a tongue movable in opposite lateral directions and provided with connecting means to detachably engage different portions of the frame.

16. In a combined side delivery rake and tedder, an axle having ground wheels, a frame pivoted to and movable on the axle and having arcuate end devices movably embracing the axle, means for securing the frame against movement on the axle, a plurality of reversible forks carried by the frame, and means for reversely operating the forks and controlled by the movement of the frame to different positions.

17. In a combined side delivery rake and tedder, an axle having ground wheels with gear devices rotatable simultaneously therewith, a frame shiftably mounted on the axle and carrying a multiple crank shaft having gear devices at opposite ends to engage either of the gear devices on the ground wheels when the frame is shifted, and reversible forks mounted on the crank shaft.

18. In a combined side delivery rake and tedder, an axle having ground wheels, a frame movably mounted on the axle and shiftable to an angular position in relation to the line of draft, a plurality of forks carried by said frame, and guard devices secured to the under side of the frame and extending over a portion of one extremity of said frame to prevent the raked material from being forced upwardly through the frame when the machine is arranged as a side delivery rake.

19. In a combined side delivery rake and tedder, a frame carrying a multiple crank shaft, means for reversing the movement of the crank shaft, boxes mounted on the cranks of the shaft and having sockets, tedder or rake arms with intermediate reduced portions rotatably mounted in the sockets, forks on the lower extremities of the arms and simultaneously rotatable with the latter, the forks being held against individual rotation on the arms, and connecting bars movably and detachably secured to the upper ends of the arms and to a portion of the frames.

20. In a combined side delivery rake and tedder, a shiftable frame carrying a multiple crank-shaft, means for reversing the movement of the crank-shaft, a plurality of tedder or rake arms held by the crank-shaft and having cross-pins in their lower extremities, and resilient forks held against individual rotation on the arms and having portions coiled around the opposite projecting parts of the pins and also looped and secured to the edges of the arms above the pins, the remaining portions of the forks being projected downwardly to form tines.

21. In a combined side delivery rake and tedder, an axle having ground wheels, a frame shiftable on the axle and having a trailer at the rear portion of one end, the trailer being provided with a cushioning spring, a plurality of forks carried by the frame, a tongue movably and adjustably connected to the frame, and a spring interposed between the tongue and the frame.

22. In a combined side delivery rake and tedder, an axle having ground wheels, a frame movably mounted on the axle and provided with a series of apertured clips at the front portion thereof in different positions, a plurality of forks adjustably carried by the frame and adapted to have their direction of movement reversed, a tongue pivotally connected to the axle and movably engaging the frame, and combined draft transmitting and brace rods movably attached to the tongue and having means to removably engage the apertured clips at the front portion of the frame.

In testimony whereof I have hereunto set my hand in presence of two subscribing witnesses.

JOHN DAVID BAKER.

Witnesses:
 LOIS VAN FOSSUN,
 W. G. WELLS.